United States Patent [19]
Wilmot

[11] 3,816,935
[45] June 18, 1974

[54] INTEGRATED ALIGNMENT SYSTEM
[75] Inventor: Charles S. Wilmot, Bellevue, Wash.
[73] Assignee: The Boeing Company, Seattle, Wash.
[22] Filed: June 19, 1972
[21] Appl. No.: 263,913

Related U.S. Application Data
[63] Continuation of Ser. No. 46,690, June 25, 1970, abandoned.

[52] U.S. Cl. .................. 33/228, 33/180 R, 33/286, 33/301, 33/318
[51] Int. Cl. ................................. G01c 15/12
[58] Field of Search ............ 33/301, 228, 318, 388, 33/338, 286, 180 R; 73/178 R

[56] References Cited
UNITED STATES PATENTS

| | | | |
|---|---|---|---|
| 2,072,779 | 3/1937 | Torbert, Jr. | 33/388 X |
| 2,423,317 | 7/1947 | Holton | 33/338 X |
| 2,570,275 | 10/1951 | Reading | 33/286 |
| 2,830,488 | 4/1958 | Agnew | 33/286 X |
| 3,056,290 | 10/1962 | Kishel | 73/178 R |
| 3,253,472 | 5/1966 | Klemes | 33/318 |
| 3,321,248 | 5/1967 | Williamson et al. | 33/286 |

FOREIGN PATENTS OR APPLICATIONS

| 930,657 | 7/1955 | Germany | 33/318 |
|---|---|---|---|

Primary Examiner—William D. Martin, Jr.
Attorney, Agent, or Firm—Glenn Orlob

[57] ABSTRACT

Platform and method for aligning the same for various aircraft orientation systems, such as inertial navigation, weather radar, flux gate compsss, etc. by integrated alignment, which is achieved by setting a prime reference position within the aircraft from fixed aircraft body structural points and respectively setting all other systems platforms from that prime position using a reference transfer gyro unit.

9 Claims, 7 Drawing Figures

PATENTED JUN 18 1974 3,816,935

INVENTOR
CHARLES S. WILMOT
BY
AGENT

INVENTOR
CHARLES S. WILMOT

BY

AGENT

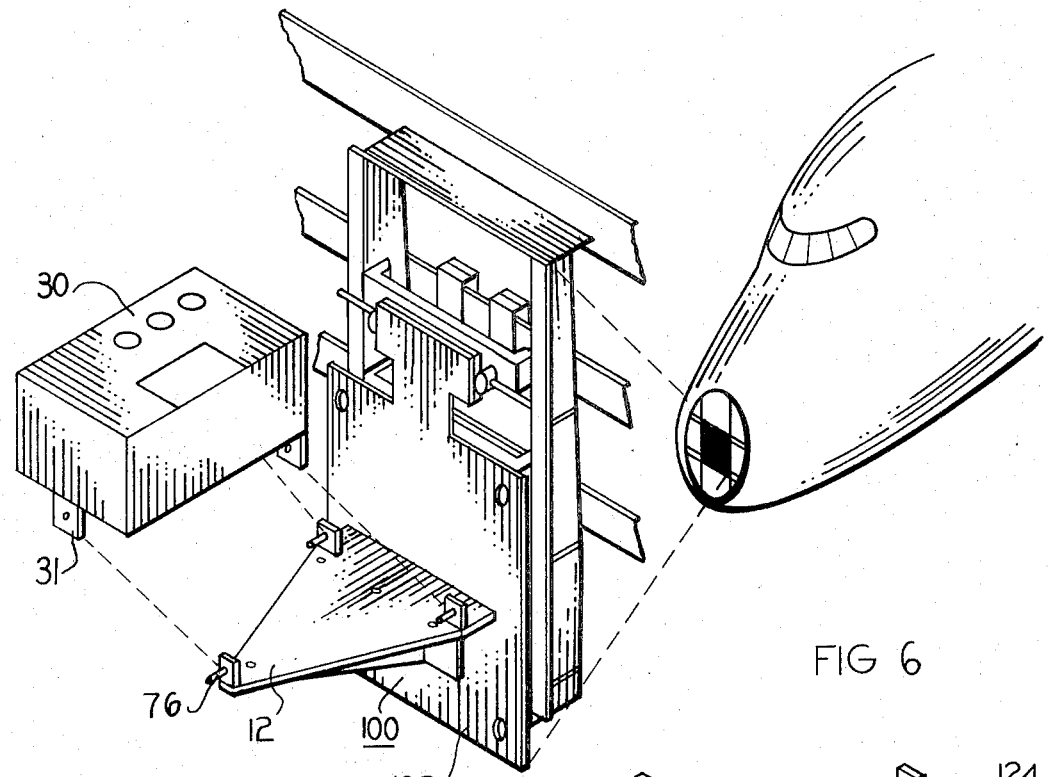
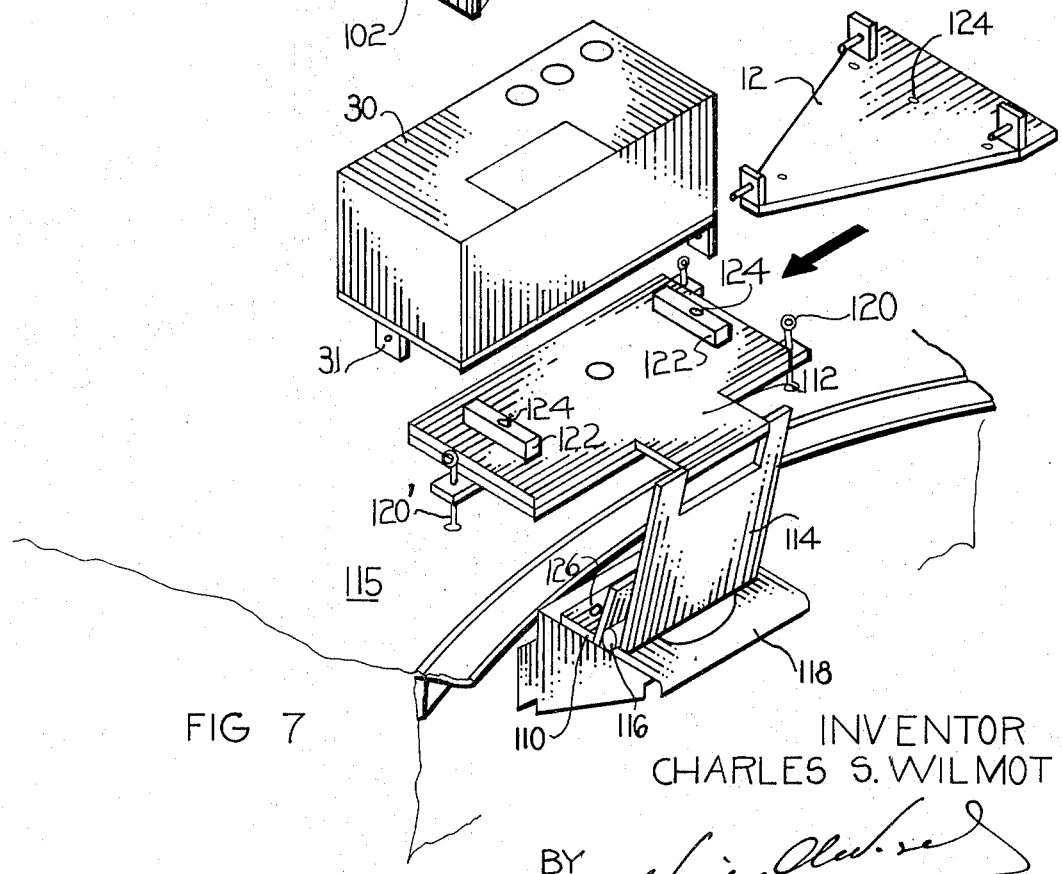

INTEGRATED ALIGNMENT SYSTEM

This is a continuation of application Ser. No. 49,690, filed June 25, 1970, now abandoned.

BACKGROUND OF THE INVENTION

1. Field of the Invention

This invention relates to platforms and the alignment method of aircraft orientation systems with a prime reference position platform and is in particular concerned with the steps of aligning platforms for orientation systems in conformity to the output of gyroscopically stabilized data obtained from an interior mounted aircraft optical tooling system.

2. Description of the Prior Art

Gyroscopically stabilized units or instruments have been widely used as a reference means in aircraft, watercraft and others, due to the greater accuracy and other advantages provided over the use of the gyroscope devices alone. However, the accuracy of such reference means is directly related to the precision in initially aligning the reference means azimuth position with externally positioned fixed reference points.

The present invention does not rely on alignment and orientation via external means, but uses a system which relies on the exact structural location of certain structural components integrally mounted to the airplane.

No reference was observed during the course of a patent search which appeared to suggest the alignment method of the present invention or the platform construction with three-point shimmed adjustable stabilizing supports. Only a few patents were noted which would be considered to be of general interest and from this group only the U.S. Pat. No. 3,071,959 by DEPP appeared to possess a somewhat closer relationship in its description of an orientation method for a compass system involving first orienting a calibrating mechanism with respect to an aircraft externally of the aircraft, then moving the calibrating mechanism to a position on the aircraft, aligning the aircraft, and finally orienting the compass with respect to the aligned aircraft (see Column 7, lines 7 – 16).

It is therefore an object of the present invention to provide for a new method called integrated alignment system for aligning orientation systems in an airplane by the use of a gyroscopically stabilized unit receiving input from existent structural reference components and to provide a platform structure having means for correct level mounting in synchronization with the unit reference output.

SUMMARY OF THE INVENTION

As mentioned before, the prior alignment systems are basically use reference points which are positioned externally of the airplane structure. Manufacturing of airplanes has been accomplished by various manufacturing systems by the several manufacturers. Most manufacturers rely on reference points and lines exterior of the airplane structure, most often integral with jigs and other tooling. The Boeing Company has basically differed in building airplanes by starting with a reference orientation of certain structural airplane components in its structural tooling layout and assembling procedures. During construction of the various components the Boeing system relies on a main reference line which is physically represented by the seating tracks on the floor assembly in the body. Any major components or parts being further mounted onto the airplane find their location in reference to the main reference line or seat track centerline. Of course, the preciseness of construction and initial step of tooling is very important and tolerances are kept to a minimum. For example, the straightness tolerance of the seat track mounted in the aircraft is within 0.02 inch of the airplane seat track length. The present integrated alignment method of airplane orientation systems primarily utilizes the existence of the physical reference axis represented by the seat track.

In order to establish the airplane reference location, three target stands are mounted at predetermined positions on the seat tracks within relation to a jig. By using a scope with an optical square the longitudinal and lateral line of sight can be obtained and set by jig adjusting screws. Thus, the jig surface is positioned at a precisely required level or surface plane. However, the location of this plane is undesirable and transfer thereof to a permanent location close to the centerline and at a station least vulnerable to structural change is necessary.

Accordingly, first a gyro unit is moved onto the jig and positioned on three locating points provided for this purpose on the jig. Second, the gyro unit, which has three meters representing azimuth, roll and pitch, is stabilized by fine tuning for precise zero or null-out within 3.6 seconds.

Now, the prime reference platform is provided with three pins adjustably mounted at the least structural changing area or most invulnerable location, which is on the wing box close to the longitudinal centerline and wing trailing edge intersection through the body. The gyro unit is moved onto the prime reference platform and consecutively azimuth, pitch and roll are individually established by mounting and shim adjusting of three supports. Final mounting of the platform is obtained after an adhesive has been applied to the three adjusting supports and curing of the adhesive is accomplished. As soon as the prime reference platform plane provided by the now permanently mounted platform is obtained, the various other platforms for various orientation and navigation apparatus, disposed at various locations throughout the airplane are installed. Again the same procedure is followed and the gyro unit is used with the prime platform as prime reference.

In order to become acquainted with the detailed operation method of the integrated alignment system and platform construction attention is directed to the following description of the invention explained in conjunction with the following figures, wherein.

Figure 4:
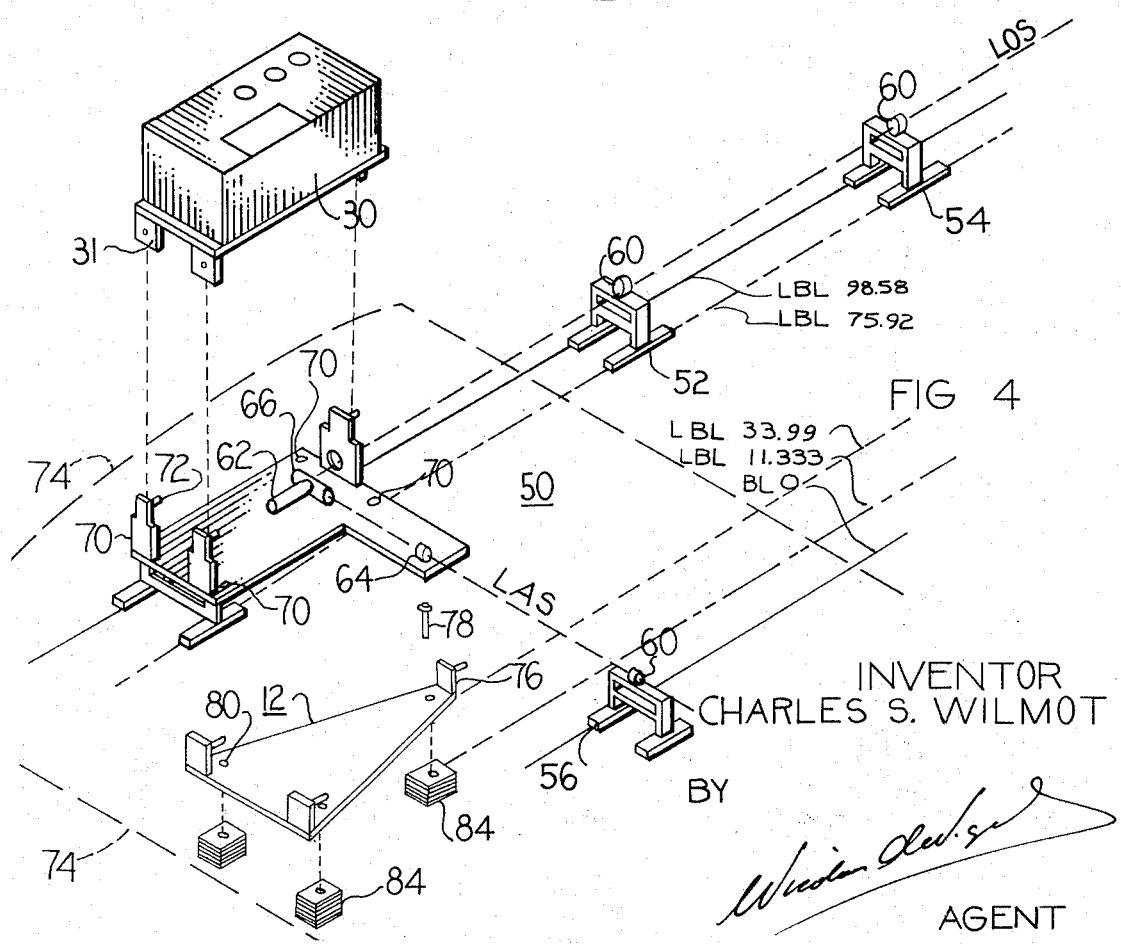

FIG. 4 presents an exploded view illustrating first steps in the method of establishing airplane reference location.

Figure 5:
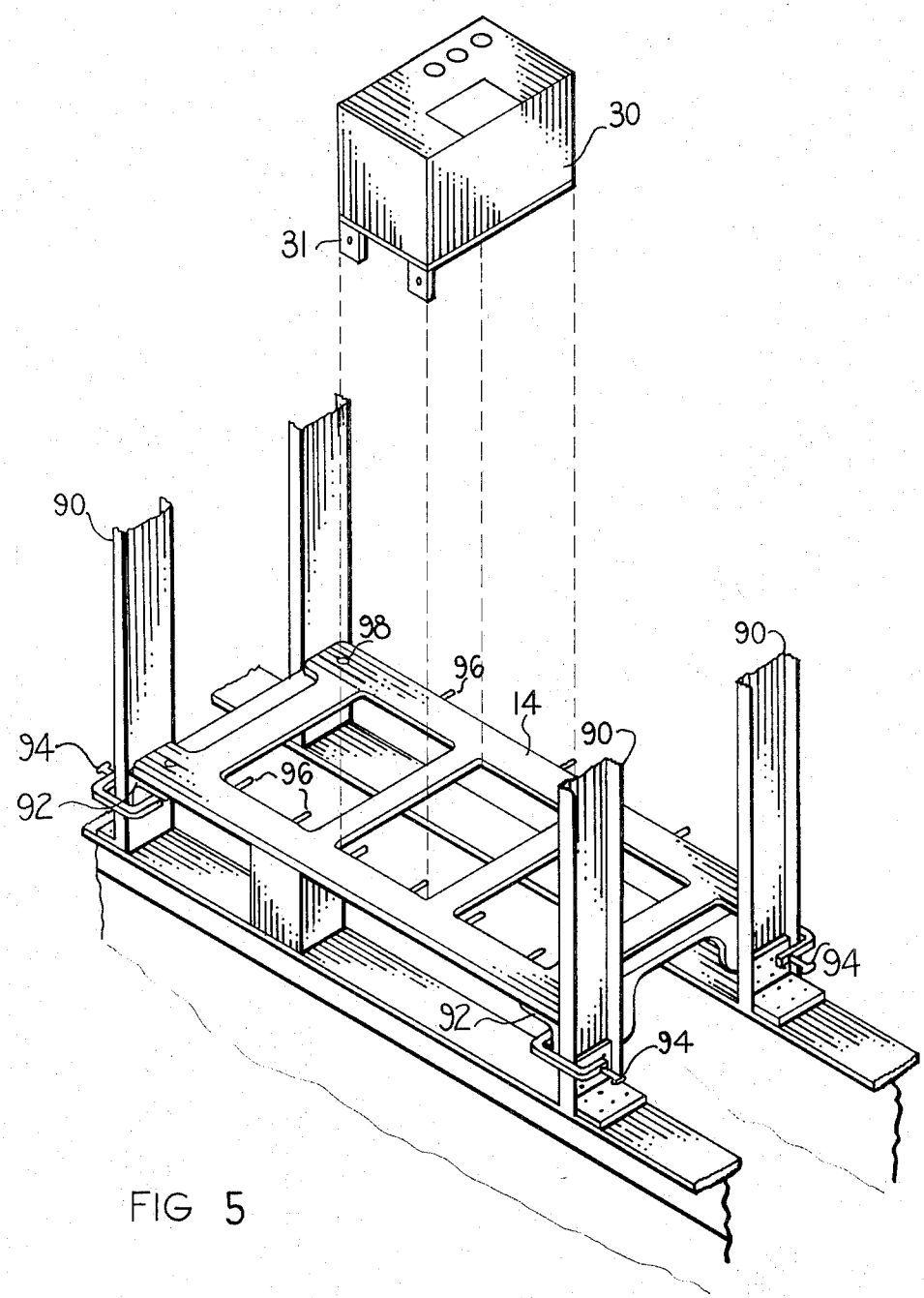

FIG. 5 is an exploded view showing the internal navigation system platform alignment procedure.

FIG. 6 is an exploded view of the installation or alignment mounting of the weather radar system platform.

FIG. 7 is an exploded view of the mounting of the flux valve guide rail at the wing tip for flux compass.

DESCRIPTION OF THE INVENTION

Prior to describing the various steps that are involved in the integrated alignment of airplane orientation systems, a short introduction as to certain requirements and facts is deemed necessary. In general, the method is based on the use of a two-gyro stabilized unit having an electronic correction system. When indexed in an attitude and activated, this system will maintain attitude reference with a random drift rate accuracy of ±0.05° per hour. Needless to say, the gyro unit is an expensive and relatively delicate instrument requiring special care in handling and application.

Briefly, the tooling sequence is to first establish the reference position in the airplane, then use this reference position for installing the airplane oriented systems structures. Due to the vibrations and motions of the airplane and the sensitive nature of the gyro unit it is mandatory that the airplane be stabilized on jacks during the operations listed hereinafter. During the performance of the alignment operations no one is permitted to be on the wings empennage.

Figure 1:
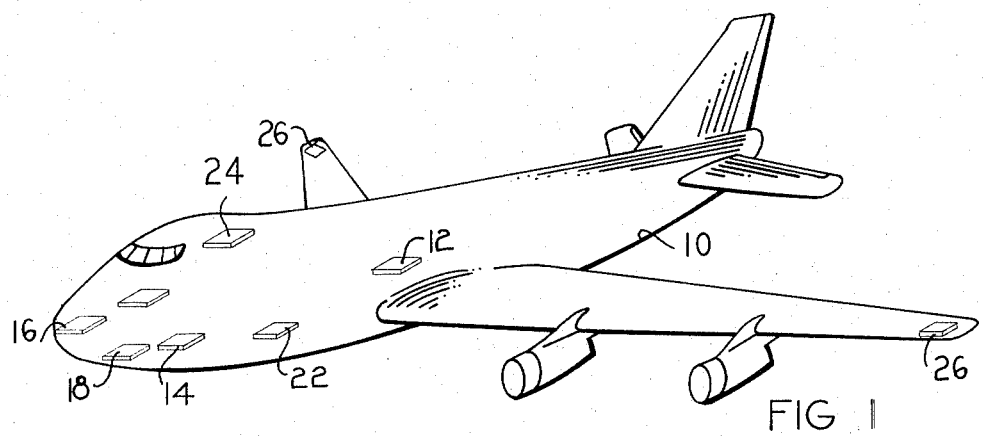
FIG. 1 is a perspective view of an airplane showing schematically the various platform locations where airplane orientation systems are mounted.

Referring now to FIG. 1 an outline of a perspectively illustrated airplane 10 is presented having schematically indicated various platforms 12 – 26 for supporting orientation systems or the like. All platforms 12 through 26 are in exact alignment, that is, within 0.1° in azimuth, roll and pitch. Platform 12 symbolizes the prime reference platform which is permanently installed at the least vulnerable structural location in the body of the airplane 10. This location is approximately at the longitudinal centerline and the wing box structure just below the floor panel installation. This prime reference platform 12 or reference tray is mounted by special procedure described hereinafter.

Platform 14 serves to support the inertial navigation equipment, platform 16 supports the weather radar equipment, platform 18 supports the flight test camera equipment, platform 20 supports the side slip transducer instrumentation, platform 22 supports the center of gravity transducer instrumentation, platform 24 supports the stall warning transducer instrumentation and the platform 26 at each wing tip area support the flux valve gate compass instrumentation.

Of course, more instruments and equipment can be introduced and added to the just listed equipment, such as for instance, the mounting of armament for air defense purposes, guns, bombing sights, etc.

Figure 2:
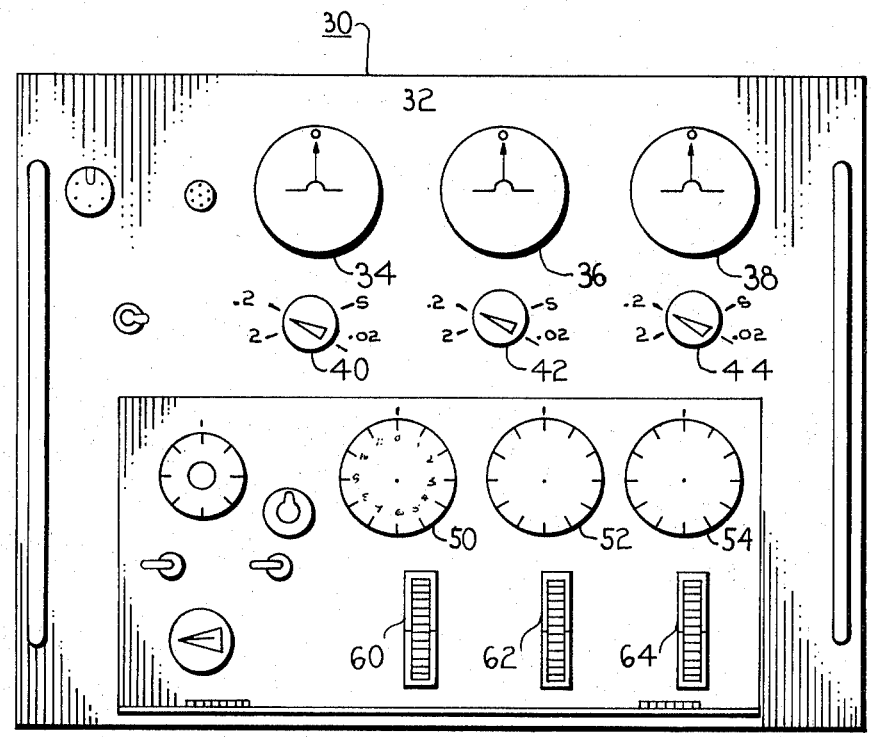
FIG. 2 shows the front panel of a gyroscopically stabilized unit.

As stated, a gyro unit 30, which comprises a portable gyroscopically stabilized unit with support bottom hooks 31, is an instrument provided with three precisely calibrated attitude indicators. For example, the gyro unit 30 shown in FIG. 2 has a control panel 32 which is provided with the necessary controls for tuning the azimuth meter 34, roll indicator 36 and pitch indicator 38. The meter's graduation is readable in three modes, depending on the setting of the range controls 40, 42 or 44, relating to azimuth, roll and pitch, respectively. As illustrated, each range control has four positions, a reading for 2°, 0.2°, a short (S) which is identical to an inoperative position for the indicator and used during transfer of the unit, and a 0.02° setting. As further indicated, the instrument is provided with fine tuning controls or nulling knobs for azimuth, roll and pitch indicated as 50, 52 and 54, respectively, and regular tuning control knobs indicated as 60, 62 and 64, respectively.

Figure 3:
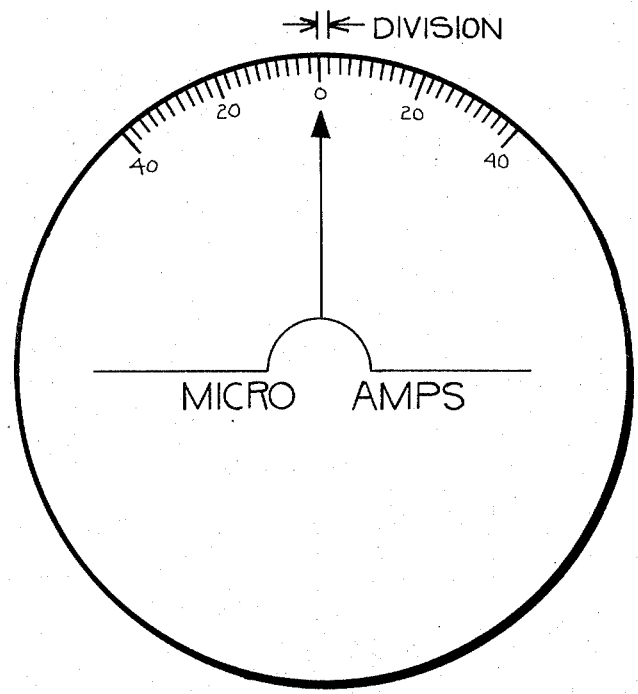
FIG. 3 is a detailed portion of the front panel shown in FIG. 2 which in particular illustrates the various modes of meter interpretation.

The graduation of the indicator or meters 34, 36 and 38 is illustrated per FIG. 3. A typical meter interpretation for the various range settings which applies identically to azimuth, roll or pitch, is as follows:

| Range Setting | Micro Amps | Deg. | Min. | Sec. |
|---|---|---|---|---|
| 2° | 1 Division | 0 | 6 | 0 |
| 0.2 | 1 Division | 0 | 0 | 36 |
| 0.02° | 1 Division | 0 | 0 | 3.6 |

The method of establishing and mounting of the prime reference surface or prime reference platform 12 in its proper permanent location is illustrated, in FIG. 4, which represents a perspective view of a floor area, inside the airplane body 10. As indicated, the floor area 50 is schematically intersected by vertical planes or in aircraft terminology, buttock lines, running parallel left and right from the centerline or longitudinal axis BL 0.0. Coincident with the floor or seat tracks are LBL 98.58 and LBL 75.92. Two target stands 52 and 54 are mounted at a predetermined distance. Another target stand 56 is mounted at the RBL 75.92 and RBL 98.58 seat tracks (right BL's not shown).

Next a jig 58 is mounted as near as possible at a right angle with the stands 52, 54 and 56.

The three target stands 52, 54 and 56 are at a fixed height to the center of the targets 60 and are not adjusted and the same applies to the scope mount 62 and aligning target 64.

The alignment scope 62 inclusive of the optical square 66 are mounted to the jig 58 and the jig is adjustably mounted with four corner screws 70.

By using the four corner adjusting screws 70 the longitudinal line of sight (LOS) can be established and thereafter the lateral line of sight (LAS). The adjusting screws 70 are then locked and the gyro unit 30 moved onto the jig 58.

During the latter procedure the gyro unit has been actuated per "setting-up" instructions and upon completion, the meters 34, 36 and 38 are set to the short position (S). When the gyro unit 30 is positioned on the three locating pins 72, the meters 34, 36 and 38 are set for 0.2° and tuned by the controls 50, 52 and 54 in combination with 60, 62 and 64 to null-out each meter. Thus, the gyro unit 30 is stabilized in position within a tolerance of 36'' for azimuth, pitch and roll.

The next step is the mounting of the reference tool tray or prime reference platform 12 onto the wing box 74. At the wing box 74, shown in phantom line fashion just underneath the floor level 50, are three stiffeners (not shown) located parallel with LBL 11.33 and LBL 33.99.

The platform 12 is loosely bolted to the forward end of the center stiffener with a bolt 78. The gyro unit 30 is then positioned on the support pins 76 located on the platform 12 and the azimuth meter 34 switched to 0.2° range by the range switch 40. By rotating the platform, null-out of the meter 34 will indicate that the platform 12 is oriented to the azimuth of jig 58.

Thereafter the gyro unit 30 is removed and the two holes 80 and 82 are drilled through the platform 12 and stiffeners underneath. The platform 12 is then removed and three shim blocks with holes 84 are positioned over all three holes. The platform 12 is repositioned over the shim blocks 84 and bolted to a uniform 5 pounds torque. The gyro unit 30 is replaced onto the locating pins 72 and by trial and error pitch and roll modes are checked while shims are delaminated from blocks 84 to get as near to a zero setting on a 0.2° range as possible. Experience has taught that certain amounts of meter variation relate to shim thickness, so that correct positioning or correct leveling of the three shim blocks 84 can be readily accomplished. During the operation of delaminating shims and finding the closest zero readout the gyro unit 30 may have to be taken off and on the platform 12 several times.

Having achieved the zero reading for pitch and roll, the gyro unit 30 and platform 12 are removed and a liberal coating of adhesive, such as a synthetic rubber of the polysulfide type is applied to the bottom of the laminated blocks 84. The platform 12 is mounted by three bolts and during torquing between 5 to 7 pound-feet, the gyro unit is checked for zero read-out on all three modes.

When the adhesive is cured, the attitude of the platform 12 has been permanently set and is thus used as prime reference to all other platforms to be installed or for check-up of all other platforms at later dates.

The platform 12 is removed and is used as tooling reference tray platform 12 for the installation or alignment of the support structure carrying other navigation or orientation systems. Thus, the existing prime reference is maintained permanently on the airplane wingbox 74 represented by the three shim blocks 84 upper surfaces and protected by plastic covers and "do not touch" warning signs underneath the floor panel structure.

INSTALLATION OF INERTIAL NAVIGATION PLATFORM

Since the prime reference is now established by the use of the gyro unit 30 and reference platform 12 at the wingbox structure, the next step will be to install the various navigation systems. As mentioned, these systems operate in correlation with one another and therefore accurate alignment is necessary, as will be clear when considering the dependent function of each system. For example, the "inertial navigation system" is a two-gyro stabilized base with an integrated electronic feedback and computing correction center. The "weather radar" is a radar aligned to and slaved to the inertial navigation system. Its function is to search for storms and locate them relative to the airplane flight path. The flux gate compass is an accurately calibrated electro-magnetic compass, aligned with the true-north-seeking feature of the inertial navigation system.

Referring now to FIG. 5, the structural uprights 90 are provided with angles 92 which are temporarily clamped by clamps 94 to the uprights 90. Platform 14 is placed on the angles 92 and leveled by conventional means. To establish the correct orientation identical to the wingbox prime reference level, the gyro unit 30 is moved and positioned on the platform 14 by inserting pins 96 with gyro bottom hooks 31. One angle 92 may be bolted permanently while the other three are clamped as described and the clamped angles 92 are adjusted so that pitch and roll are read as zero on the gyro unit 30 meters. The one bolt 98 is fastened and now the platform 14 is rotated until a zero azimuth indication on the gyro unit 30 is obtained. Subsequently all angles are now bolted and the tray is permanently mounted. The inertial navigation system can now be installed on pins 96.

INSTALLATION OF WEATHER RADAR

The weather radar is in front of the nose section and the support structure carrying the weather radar should be accurately mounted to the airplane structure.

The first step is to clamp the support structure in place to the permanent airplane structure. The second step is to assemble some tool components 100 which include tray 12 and a vertically positioned member 102. Then the tool components 100 are temporarily connected to the weather radar support structure (not shown, but located behind the member 102) and roughly aligned.

Then the gyro unit 30 is positioned on the pins 76 and alignment by bolting, adjusting, rotating and final mounting of the radar support structure to the airplane structure is accomplished, in coordination with the gyro unit 30 null-out attitude checking procedures, as described. Having achieved the correct platform mounting location, the tooling, including the prime reference tooling platform 12, is removed and the weather radar is installed.

INSTALLATION OF THE FLUX GATE COMPASS

As stated, the electro-magnetic flux gate compass is to be aligned with the true-north-seeking feature of the I.N.S. and, therefore, the prime important feature is to obtain a support structure or guide rail 110 mounting having an azimuth reading which is identical.

First, a tooling tray having a platform 112 and hinged arm 114 is placed at the wing upper surface 114. The wing tip is removed and the arm 114 placed against an index bar 116 located on the flux valve support structure 118. The tooling platform 112 is provided with level adjusting means 120 which are used to roughly level the tooling platform 112 upper surface. Now the prime platform 12 is bolted onto the bars 122 using centerline hole 124 provided for this purpose. The gyro unit 30 is then positioned as described before by inserting pins 76 into hooks 31 and the azimuth range 0.02 and meter are operated. By rotating the platform 12 about the front axis or leveler 120', a zero reading should be obtained, which via arm 114 will move guide rail 110 in perfect alignment. Now the guide rail 110, which is provided with two set screws 126, is permanently fastened so that after removal of the gyro unit 30 and the tooling 12, 112, 114 and 116, the flux gate compass can be installed onto the aligned and mounted guide rail 110.

In general the basic alignment of all orientation system bases or support structures varies slightly as described, yet the principle of operation is similar. Except for the INS alignment, the prime reference tray or platform 12, which is a precise tooling instrument developed during the set-up of the prime reference platform level with shim blocks 84, plays an important role in the system. The platform 12 is a somewhat triangularly shaped flat member having support pins 76 which are located at a precise standard position and height, complementing the bottom hooks 31 of the gyro unit 30. The holes in the platform 12 are located during the method of alignment and thus each airplane has its individual platform tool reference 12.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A method for aligning the support structures for navigation equipment or the like in an aircraft comprising the steps of:
   a. optically aligning a jig for roll, pitch, and azimuth by utilizing aircraft structural references,
   b. tuning a gyro unit azimuth, pitch and roll indicators within a required tolerance of stabilization on the jig,
   c. mounting a tool reference platform on adjustable mounting means at a predetermined location in said airplane,
   d. stabilizing the platform by adjusting the adjustable mounting means per stabilized gyro unit azimuth, pitch and roll information,
   e. mounting permanently the adjustable mounting means to the platform level and azimuth obtained, and
   f. using the permanently mounted adjustable means as prime reference for installing the support structures for said navigational equipment by utilizing the gyro unit as per step (d) and step (e).

2. The method as claimed in claim 1 wherein the step of optically aligning the jig surface includes the steps of
   a. positioning at least a first target means at one aircraft structural reference,
   b. positioning at least a second target means on another aircraft structural reference forward of the first target means, and
   c. positioning a jig carrying a scope having an optical square mounted on the jig adjustable surface in line with said first structural reference so that the scope is located at the perpendicular intersection of the two targets.

3. The method as claimed in claim 2 wherein said step for adjustably mounting said tool reference platform includes the steps of
   a. fastening a fastener loosely between platform and airplane permanent structure,
   b. positioning the gyro unit on the platform,
   c. rotating the platform about the fastener for finding correct azimuth per gyro unit indicator,
   d. clamping the platform, and
   e. locating and drilling one hole at each side of the fastener location so that hole-fastener-hole forms a triangular pattern.

4. The method as claimed in claim 3 wherein the step of stabilizing the platform and adjusting means includes the steps of
   a. inserting shim blocks under the platform holes and fastener locations,
   b. stabilizing the platform for correct roll position by removing shim layers per gyro unit roll indicator,
   c. stabilizing the platform for correct pitch position by removing shim layers per gyro unit pitch indicator.

5. The method as claimed in claim 4 wherein the step of permanently mounting the adjusting means includes the steps of
   a. applying adhesive between the shim blocks and permanent airplane structure,
   b. fastening the shim blocks by fastening means while observing gyro unit output for roll and pitch,
   c. waiting for adhesive to cure.

6. A method for aligning the support structures for navigation equipment or the like in an aircraft comprising the steps of
   a. optically aligning a jig surface for roll, pitch and azimuth by utilizing aircraft seat track locations as references,
   b. tuning a gyro unit azimuth, pitch and roll indicators within a required tolerance of stabilization,
   c. mounting a tool reference platform on adjustable mounting means at a predetermined location in said airplane,
   d. stabilizing the platform by adjusting the adjustable mounting means per stabilized gyro unit azimuth, roll and pitch information,
   e. applying a liquid having curing quality to the inner face of the adjustable mounting means,
   f. fastening the adjustable mounting means with bolts per gyro unit output information,
   g. waiting until the liquid is hardened, and
   h. using the permanently bolted adjusting means as prime reference for level and azimuth for installing support structures as per steps (c), (d) and (f).

7. The method as claimed in claim 6 wherein the step of optically aligning the jig surface includes the steps of
   a. positioning at least two target means on one seat track for establishing a line,
   b. positioning at least a third target means on a parallel seat track lineary different from the first two target means for establishing a plane through the line and a point and,
   c. positioning a jig, carrying a scope with optical square mounted on the jig adjustable surface, at the point on the line on the seat track.

8. The method as claimed in claim 7 wherein said mounting of said reference platform on said adjustable mounting means includes the steps of
   a. fastening a bolt loosely between platform and airplane permanent structure,
   b. positioning the gyro unit on the platform,
   c. rotating the platform about the bolt for finding correct azimuth per gyro unit indicator,
   d. clamping the platform, and
   e. locating and drilling one hole at each side of the bolt location so that hole-bolt-hole forms a triangular pattern.

9. The method as claimed in claim 8 wherein the step of stabilizing the platform and adjusting means includes the steps of
   a. inserting shim blocks under the platform holes and bolt locations,
   b. stabilizing the platform for correct roll position by removing shim layers per gyro unit roll indicator,
   c. stabilizing the platform for correct pitch position by removing shim layers per gyro unit pitch indicator.

* * * * *